United States Patent
Nagami (10) Patent No.: US 9,053,414 B2
(45) Date of Patent: Jun. 9, 2015

(54) IMAGE PROCESSING APPARATUS CONFIGURED TO DETECT AN ABNORMAL CONTROLLER STATE

(71) Applicant: Masahiro Nagami, Anjo (JP)

(72) Inventor: Masahiro Nagami, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/953,890

(22) Filed: Jul. 30, 2013

(65) Prior Publication Data

US 2014/0029044 A1 Jan. 30, 2014

(30) Foreign Application Priority Data

Jul. 30, 2012 (JP) ................................ 2012-168558

(51) Int. Cl.
*G06K 15/00* (2006.01)

(52) U.S. Cl.
CPC .................... *G06K 15/408* (2013.01)

(58) Field of Classification Search
CPC ....... G06F 21/60; G06K 15/408; G06K 15/00
USPC .......... 358/1.14, 1.16, 1.15, 296; 399/18, 37, 399/88, 19; 714/22, 24, 32; 710/110
See application file for complete search history.

(56) References Cited

U.S. PATENT DOCUMENTS

2008/0114996 A1* 5/2008 Suzuki .......................... 713/320
2009/0323120 A1* 12/2009 Yamanaka ................... 358/1.16

FOREIGN PATENT DOCUMENTS

JP 2004-262065 A 9/2004

OTHER PUBLICATIONS

Iwase, Image Processing Apparatus, Jan. 5, 2012, JP 2012003506 A.*

* cited by examiner

*Primary Examiner* — Martin Mushambo
(74) *Attorney, Agent, or Firm* — Banner & Witcoff, Ltd.

(57) ABSTRACT

An image processing apparatus includes an image processing unit, a switch which receives an input of a power supply-off command, a first controller which supplies power to at least the image processing unit, and a second controller. The first controller detects an input to the switch, and when an input to the switch is detected at a state where the apparatus is supplied with power, performs power supply-off processing of switching the apparatus to a state where the apparatus is not supplied with power. The second controller detects whether the first controller is at an abnormal state, and when it is detected the first controller is at the abnormal state, performs vicarious processing of performing at least a part of the power supply-off processing of the first controller.

6 Claims, 8 Drawing Sheets

IMAGE PROCESSING APPARATUS CONFIGURED TO DETECT AN ABNORMAL CONTROLLER STATE

CROSS-REFERENCE TO RELATED APPLICATION

This application claims priority from Japanese Patent Application No. 2012-168558, filed on Jul. 30, 2012, the entire subject matter of which is incorporated herein by reference.

TECHNICAL FIELD

Aspects of the present invention relate to an image processing apparatus which performs image processing.

BACKGROUND

There has been known a power supply managing technique which switches an own apparatus from a power supply-on state to a power supply-off state on a condition that a power supply-off command is received. Here, the power supply-on state refers to a state where power is supplied to constitutional elements of the apparatus, and the power supply-off state refers to a state where power is supplied to only a constitutional element for receiving a power supply-on command and is not supplied to the other constitutional elements.

For example, JP-A-2004-262065 describes an image forming apparatus in which, when a user turns off a power supply switch, various controllers perform power supply-off control. The image formation apparatus has two controllers, and when the image forming apparatus switches from the power supply-on state to the power supply-off state, each controller performs shut down processing and the power supply is interrupted after the shut down processing of all the controllers is completed.

SUMMARY

However, according to the above-described technique, a following problem might occur. That is, in the apparatus which interrupts the power supply on a condition that the power supply-off processing such as shut down processing is completed, it is difficult to switch to the power supply-off state when the controller which performs the power supply-off processing is caused to enter an abnormal state such as hang-up.

Accordingly, an aspect of the present invention provides an image processing apparatus having a higher possibility to be able to switch to a power supply-off state when a power supply-off command is received.

According to an illustrative embodiment of the present invention, there is provided an image processing apparatus includes an image processing unit, a switch, a first controller and a second controller. The image processing unit is configured to perform image processing. The switch is configured to receive an input of a command of power supply-off. The first controller is configured to supply power to at least the image processing unit of the apparatus. The second controller is configured to perform control different from the first controller. The first controller is configured to detect an input to the switch, and when an input to the switch is detected at a state where the apparatus is supplied with power, perform power supply-off processing of switching the apparatus to a state where the apparatus is not supplied with power. The second controller is configured to detect whether the first controller is at an abnormal state, and when it is detected the first controller is at the abnormal state, perform vicarious processing of performing at least a part of the power supply-off processing of the first controller.

The above image processing apparatus includes the first controller and the second controller. Even when the first controller performing the power supply-off processing is caused to be an abnormal state, the second controller which is a controller different from the first controller performs at least a part of the power supply-off processing. Therefore, it is possible to increase a possibility that the apparatus will be able to switch to the power supply-off state where power is not supplied.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an image processing apparatus of an illustrative embodiment of the present invention will be specifically described with reference to the accompanying drawings. In this illustrative embodiment, an inventive concept of the present invention is applied to a complex machine (MFP: Multi-Function Peripheral) having an image reading function and an image forming function.

[Configuration of MFP]

Figure 1:
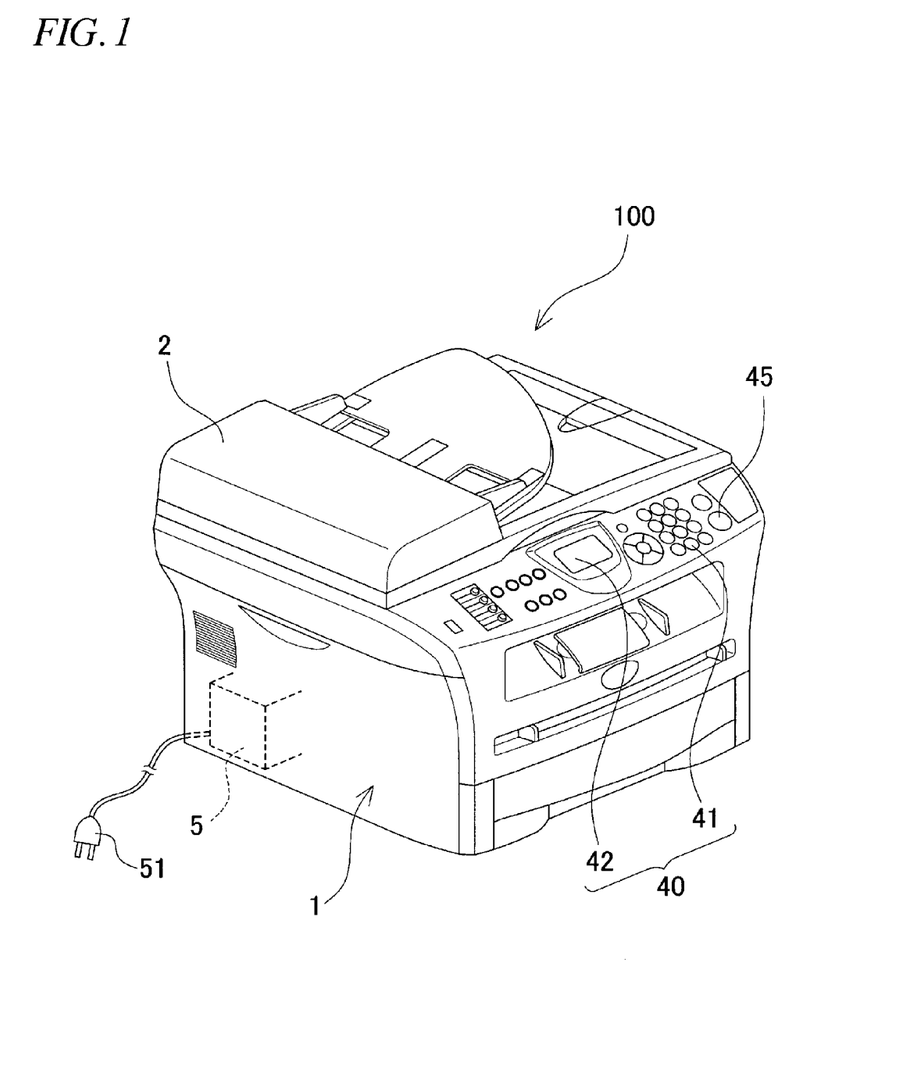
FIG. 1 is a perspective view showing an outer appearance of an MFP according to an illustrative embodiment of the present invention.

As shown in FIG. 1, an MFP 100 of this illustrative embodiment has an image forming unit 1 (an example of an image processing unit) which prints an image on a sheet and an image reading unit 2 (an example of an image processing unit) which reads an image of an original document. The image forming unit 1 is provided below the image reading unit 2. An image forming type of the image forming unit 1 may be an electro-photographic or inkjet type. Also, a color image may be formed or only a black-and-white image may be formed. The image reading unit 2 has a configuration of reading a set original document to thus generate image data. The configurations of the image forming unit 1 and the image reading unit 2 may be generally known and the descriptions thereof will be here omitted.

Also, the MFP 100 has, on its front surface, an operation panel 40 having a button group 41 consisting of various buttons (for example, a start key, a stop key and respective buttons of a numerical keypad) and a display unit 42 consisting of a liquid crystal display. With the button group 41 or display unit 42, an operating status can be displayed and a user can input commands.

Also, the operation panel 40 is provided with a power supply switch 45 (an example of a switch and a set unit) for inputting a command of power supply-off processing. In the meantime, the power supply switch 45 may be provided to a place different from the operation panel 40. The power supply switch 45 also has a function of inputting a command of returning to a power supply-on state. Therefore, when an input operation is performed at a power supply-on state, the MFP 100 receives the input operation as a command of power supply-off processing, and when an input operation is performed at a power supply-off state, the MFP 100 receives the input operation as a command of returning to a power supply-on state. Hence, the power supply switch 45 is supplied with power from a power supply unit 5 (which will be described later) even at the power supply-off state.

Also, the MFP 100 has the power supply unit 5 which supplies power to the respective units including the image forming unit 1 and the image reading unit 2. The power supply unit 5 is provided with a plug 51. When a user inserts the plug 51 into a socket of commercial power, for example, the power supply unit 5 is supplied with the power from the outside. The power supply unit 5 is supplied with the power from the outside and converts and outputs the supplied power to operation power which is suitable for each of the constitutional elements of the apparatus.

[Electrical Configuration of MFP]

Figure 2:
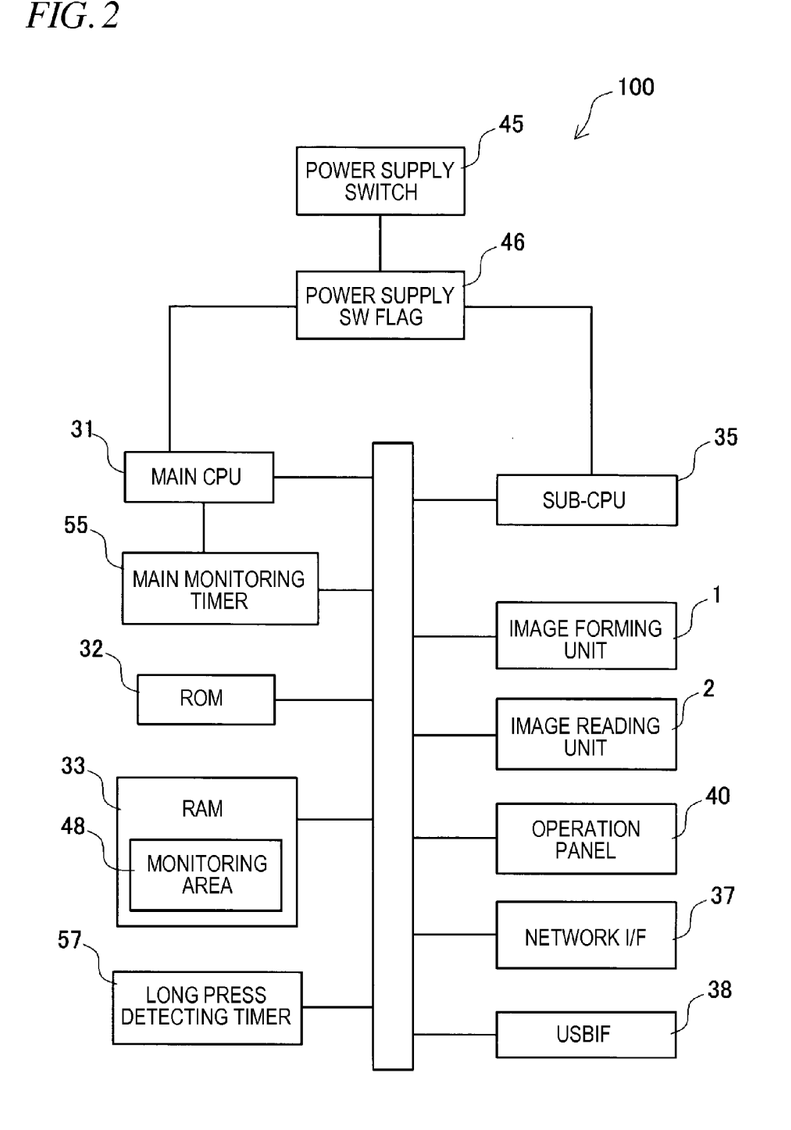
FIG. 2 is a block diagram showing an electrical configuration of the MFP shown in FIG. 1.

Subsequently, an electrical configuration of the MFP 100 is described. As shown in FIG. 2, the MFP 100 has a main CPU 31, a ROM 32, a RAM 33 and a sub-CPU 35. Further, the MFP 100 has the image forming unit 1, the image reading unit 2, the operation panel 40, a network interface 37 and a USB interface 38.

The main CPU 31 (an example of a first controller) performs calculations for implementing a variety of functions such as an image reading function, an image forming function and the like in the MFP 100 and plays a central role in the control. The main CPU 31 stores a processing result in the RAM 33 and controls the respective constitutional elements of the MFP 100, based on a control program read out from the ROM 32. The main CPU 31 also controls the power supply unit 5 (refer to FIG. 1), thereby controlling the power supply to the respective constitutional elements such as the image forming unit 1, the image reading unit 2 and the like.

The sub-CPU 35 (an example of a second control unit) performs a variety of processing in cooperation with the main CPU 31. The sub-CPU 35 can operate, irrespective of the state of the main CPU 31, for example, even though the main CPU 31 is at an abnormal state such as hang-up. Also, the sub-CPU 35 performs processing of monitoring the state of the main CPU 31 all the time. The monitoring method will be specifically described later. The sub-CPU 35 operates for a part of the functions of the main CPU 31 when it is determined that the main CPU 31 is at an abnormal state such as hang-up. The main CPU 31 and the sub-CPU 35 may be provided on one substrate or may be provided on different substrate.

The ROM 32 stores therein a variety of control programs for controlling the MFP 100, an image processing program, a variety of settings, initial values and the like. The ROM 32 is non-volatile and is a flash ROM, for example.

The RAM 33 is used as a work area from which the various control programs are read out or a storage area in which image data of an original document read in the image reading unit 2 or image data transmitted through the network interface 37 is temporarily stored. The RAM 33 is an SDRAM, for example. In the meantime, the ROM 32 and the RAM 33 can be accessed (accessible) from any of the main CPU 31 and the sub-CPU 35.

The network interface 37 is connected to a network. The MFP 100 is configured to perform data communication with the other information processing apparatus (not shown) through the network interface 37. Also, the USB interface 38 is connected to a peripheral device (not shown) that can be USB-connected. The MFP 100 is configured to perform data communication with an external peripheral device and the like through the USB interface 38.

Also, the MFP 100 has a power supply SW flag 46 (an example of a flag) which is provided in the storage area which can be accessed from any of the main CPU 31 and the sub-CPU 35. The power supply SW flag 46 is an area in which data indicating a set state is recorded when a user pushes or opens the power supply switch 45. The operation of recording the data indicating a set state as the power supply SW flag 46 is hereinafter referred to that the power supply SW flag 46 is set. Also, an operation of recording data, other than the data indicating the set state, as the power supply SW flag 46 is hereinafter referred to that the power supply SW flag 46 is reset. The data indicating the set state is a value other than '0', for example.

Also, the RAM 33 is provided with a monitoring area 48 which is used for the sub-CPU 35 to monitor a state of the main CPU 31. The monitoring area 48 (an example of an access unit) is an area which can be accessed (accessible) from any of the main CPU 31 and the sub-CPU 35.

Also, the MFP 100 has two timers, specifically, a main monitoring timer 55 (an example of an access unit) and a long press detecting timer 57. Either of those timers can be accessed by the main CPU 31 and the sub-CPU 35.

The main CPU 31 periodically performs a recording in the main monitoring timer 55, and the sub-CPU 35 periodically performs a readout from the main monitoring timer 55. The main monitoring timer 55 is a watch dog timer, for example, and is preferably a hard timer for which time-up is predetermined.

The long press detecting timer 57 is a timer which can be accessed for timer setting and timer value reading by any of the main CPU 31 and the sub-CPU 35. When the long press detecting timer 57 is time-up, it is notified by a timer interrupt to one of the main CPU 31 and the sub-CPU 35 having set a timer.

[Power Supply States of MFP]

At a state where commercial power is supplied to the power supply unit 5, the power supply state of the MFP 100 includes a power supply-on state and a power supply-off state. The power supply-on state is a state where the power is supplied to the apparatus and is a state where the necessary power is supplied at least to the main CPU 31 and the sub-CPU 35. The power supply-off state is a state where the power is not supplied to the apparatus and is a state where only the push operation of the power supply switch 45 can be received. At the power supply-off state, the power is not supplied to both the main CPU 31 and the sub-CPU 35.

When the power supply switch 45 is pushed at the power supply-on state, the MFP 100 switches to the power supply-off state. In the meantime, as long as the commercial power is supplied to the power supply unit 5, the power supply unit 5 operates at both the power supply-on state and the power supply-off state and monitors whether the power supply switch 45 is pushed.

The power supply unit 5 (hereinafter, simply referred to as 'power supply switch 45') monitoring whether the power supply switch 45 is pushed transmits an interrupt signal (hereinafter, referred to as 'switch interrupt') to the main CPU 31 and the sub-CPU 35 through an interrupt controller (not shown) and sets the power supply SW flag 46 when an pushing operation on the power supply switch 45 by a user is received.

With the signal of the switch interrupt transmitted by the power supply switch 45, the main CPU 31 and the sub-CPU 35 can detect that the power supply switch 45 is operated by the user. In the meantime, the signal of the switch interrupt is transmitted when the power supply switch 45 is pushed and is opened, which is a so-called both edge detection.

When the power supply switch 45 is pushed at the power supply-on state, the main CPU 31 performs power supply-off processing. When it is determined that the main CPU 31 cannot perform the appropriate power supply-off processing even though the power supply switch 45 is pushed at the power supply-on state, the sub-CPU 35 performs the power supply-off processing for the main CPU 31.

In the meantime, at the power supply-off state, the power is supplied to the power supply unit 5 and the power supply switch 45. At the power supply-off state, the power is supplied neither to the main CPU 31 nor the sub-CPU 35. When the power supply switch 45 is pushed at the power supply-off state, the power supply unit 5 resumes supplying the power to the main CPU 31, the sub-CPU 35 and the like and switches the MFP 100 to the power supply-on state.

[Power Supply-Off Control Processing (Main CPU)]

Subsequently, the power supply-off control processing which is performed by the main CPU 31 is described with reference to a flowchart of FIG. 3. The power supply-off control processing is performed when the MFP 100 switches to the power supply-on state and continuously performed by the main CPU 31 while the MFP 100 is at the power supply-on state.

While the MFP 100 is at the power supply-on state, the main CPU 31 periodically clears the main monitoring timer 55 at a predetermined appropriate interval (S101). A timer value of the main monitoring timer 55 changes as shown in FIG. 4 while the main CPU 31 normally operates. The main monitoring timer 55 shown in FIG. 4 is a countdown timer having a timer value which decreases as time goes.

The timer value of the main monitoring timer 55 uniformly changes as time goes, and returns to a predetermined value by the clear processing of the main CPU 31. The main CPU 31 performs the clear processing at appropriate timing such that the main monitoring timer 55 is not time-up. In the meantime, the main monitoring timer 55 may be a count-up timer having a timer value which increases over time.

Figure 3:
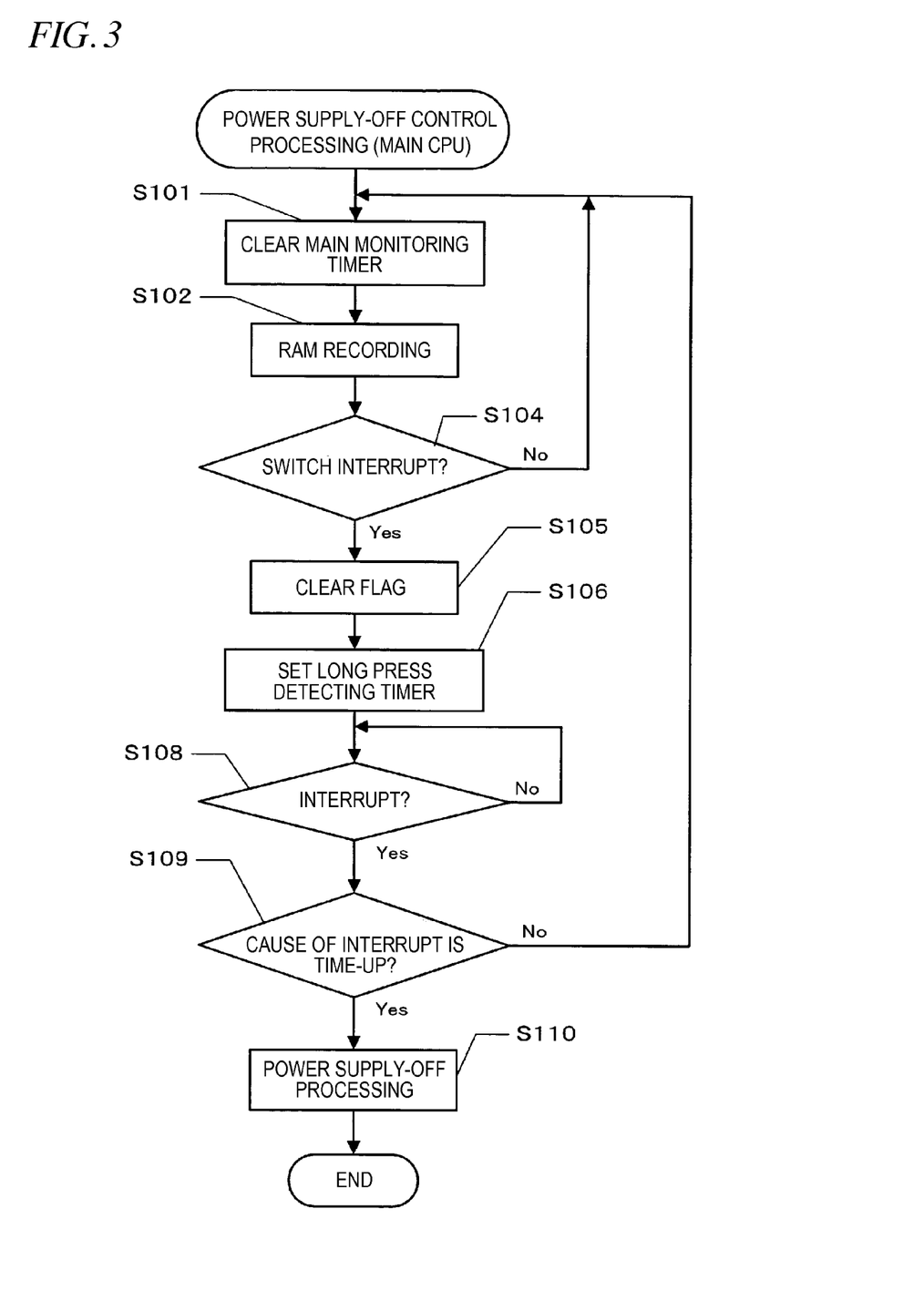
FIG. 3 is a flowchart showing power supply-off control processing which is performed in a main CPU.
Figure 4:
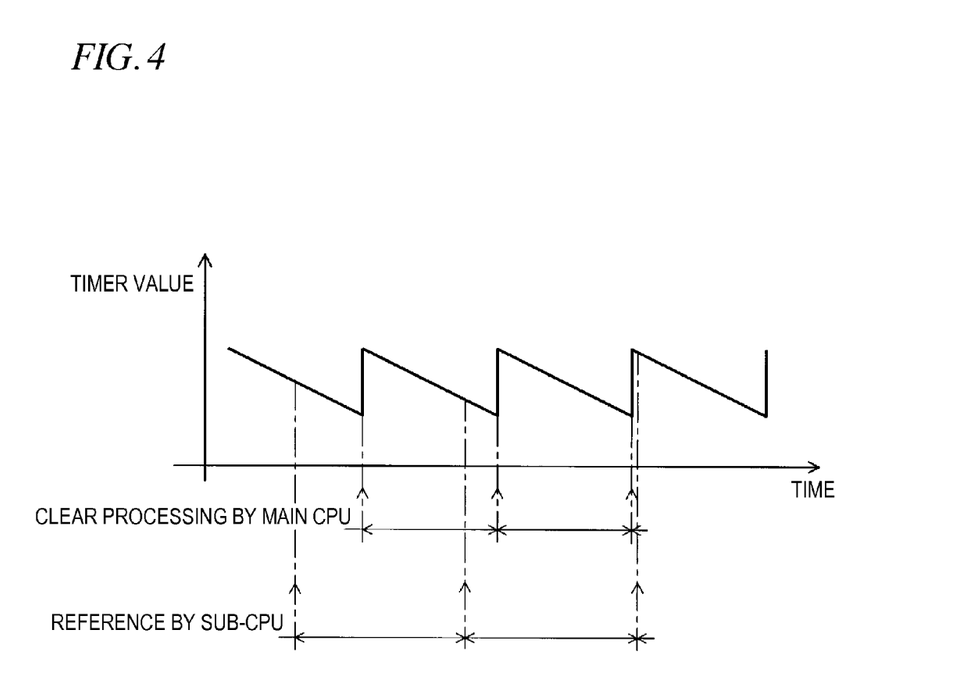
FIG. 4 is an explanatory view showing a change of a timer value in a main monitoring timer.

The main CPU 31 records a value in the monitoring area 48 of the RAM 33 (S102 in FIG. 3). The value to be recorded is a random value, for example. Alternatively, the value may be a value which is different from a value recorded in previous time. A time interval during which the processing of S102 is performed may not be necessarily the same as that of the processing of S101. Also, the performing timing of the processing of S102 may not be periodical.

In the meantime, the processing of S101 and S102 is processing which is performed by the main CPU 31 so as for the sub-CPU 35 to determine the state of the main CPU 31. Only any one of S101 and S102 may be performed. However, when both S101 and S102 are performed, it is possible to determine the state of the main CPU 31 more reliably.

While the MFP 100 is at the power supply-on state, the main CPU 31 determines whether the signal of the switch interrupt is received from the power supply switch 45 so as to detect whether the power supply switch 45 is pushed (S104). When the signal of the switch interrupt is not received from the power supply switch 45 (S104: No), the main CPU 31 repeats the processing of S101 and S102 at a constant interval until the user pushes the power supply switch 45.

Also, when the user pushes the power supply switch 45, the power supply SW flag 46 is set by the power supply switch 45. When the signal of the switch interrupt is received from the power supply switch 45 (S104: Yes), the main CPU 31 resets the power supply SW flag 46 (S105). In S105, the main CPU 31 functions as an example of a reset unit.

Subsequently to S105, the main CPU 31 sets the long press detecting timer 57 to a predetermined time (S106). The set time is a predetermined input duration, for example, about 2 seconds. When the time during which the user pushes the power supply switch 45 is shorter than the predetermined input duration, the main CPU 31 determines that the power supply-off is not intentionally pushed. That is, the main CPU 31 confirms whether the input state of the power supply switch 45 continues for a predetermined time or longer by using the long press detecting timer 57, thereby determining whether the user has an intention of the power supply-off.

Subsequently, the main CPU 31 stands by until an interrupt signal is received (S108: No). In S108, the main CPU 31 waits for a time-up interrupt from the long press detecting timer 57 set in S106 or a switch interrupt from the power supply switch 45. When an interrupt signal is received (S108: Yes), the main CPU 31 checks a cause of the interrupt and determines whether the cause of the interrupt is a time-up of the long press detecting timer 57 (S109).

In S109, when it is determined that the cause of the interrupt is a time-up of the long press detecting timer 57 (S109: Yes), it means that the user continues to push the power supply switch 45 for a predetermined time or longer. Thus, when the long press detecting timer 57 is time-up, the main CPU 31 determines that the user has an intention of turning off the MFP 100 and performs the power supply-off processing (S110). Then, the main CPU 31 ends the power supply-off control processing.

Meanwhile, the power supply-off processing includes processing of moving the set state of the MFP 100 and a variety of registered data from the volatile memory to the non-volatile memory, processing of interrupting the power being supplied to the respective units in an appropriate order, and the like. When performing the power supply-off processing, the main CPU 31 functions as an example of a power supply control unit. At a final step of the power supply-off processing, the main CPU 31 instructs the power supply unit 5 to interrupt the power supply to the units except for the power supply switch 45, so that the power supply-off state is made.

On the other hand, in S109, when it is determined that the cause of the interrupt is not a time-up of the long press detecting timer 57 (S109: No), there is a possibility that the cause of the interrupt is the switch interrupt which is transmitted when the power supply switch 45 is returned from the pushed state to the non-pushed state within predetermined time. When the cause of the interrupt is the switch interrupt which is transmitted when the power supply switch 45 is returned from the pushed state to the non-pushed state within the predetermined time, it means that the input state of the power supply switch 45 is returned in a short time from the pushed state to the non-pushed state without continuing for the predetermined input duration.

When the signal by the switch interrupt, which is transmitted when the power supply switch 45 is returned from the pushed state to the non-pushed state within predetermined time, is received, not by the time-up, it can be determined that the user does not want the switch to the power supply-off. Therefore, the main CPU 31 returns to S101 without performing the power supply-off processing, and continues to perform the periodic recording processing (S101 and S102) and the monitoring processing (S104) of the power supply switch 45. With the above, the description of the power supply-off control processing in the main CPU 31 ends.

Main CPU Monitoring Processing (Sub-CPU)

First Illustrative Embodiment

In the below, main CPU monitoring processing which is performed in the sub-CPU 35 and monitors an operating state of the main CPU 31 is described with reference to flowcharts shown in FIGS. 5 and 6. This processing is performed when the MFP 100 turns on, and is continuously performed while the MFP 100 is at the power supply-on state.

In the meantime, regarding a timer value of the main monitoring timer 55 in previous time, '0' is stored in the RAM 33, as an initial value. In S202, the timer value is set such that a timer value of the main monitoring timer 55 read in previous time is different from a timer value of the main monitoring timer 55, which is read in this time.

In S101 and S102 of FIG. 3, the main CPU 31 performs the periodic recording processing. When the periodic recording processing is normally performed, the sub-CPU 35 can determine whether the main CPU 31 is at a normal state where the main CPU normally operates.

First, the sub-CPU 35 reads out the main monitoring timer 55 so as to determine the state of the main CPU 31 (S201). Specifically, the sub-CPU 35 periodically reads out a timer value of the main monitoring timer 55 at a time interval different from that of the clear processing of the main CPU 31. When the main CPU 31 is at the normal state, the timer value of the main monitoring timer 55 changes, as shown in FIG. 4.

The interval at which the sub-CPU 35 reads out the timer value of the main monitoring timer 55 is set to be a time interval at which the timer value is changed whenever the timer value of the main monitoring timer 55 is read out. Therefore, each time, the timer value which is read out by the sub-CPU 35 is different from that read out in previous time. In the meantime, when the main CPU 31 is at an abnormal state, the timer value which is read out by the sub-CPU 35 is the same as that read out in previous time, because the clear processing by the main CPU 31 is not performed.

Accordingly, the sub-CPU 35 determines whether the timer value of the main monitoring timer 55 that is read out by the sub-CPU 35 in S201 is the same as that of the main monitoring timer 55 read out in previous time (S202). When it is determined that the timer value of the main monitoring timer 55 which is read out by the sub-CPU 35 in S201 is not the same as that of the main monitoring timer 55 read out in previous time (S202: No), the sub-CPU 35 determines that the main CPU 31 is at the normal state, updates the timer value of the main monitoring timer 55 in previous time to the timer value of the main monitoring timer 55 which is read out by the sub-CPU 35 in S201 (S203) and returns to S201. On the other hand, when it is determined that the timer value of the main monitoring timer 55 which is read out by the sub-CPU 35 in S201 is the same as that of the main monitoring timer 55 read out in previous time (S202: Yes), the sub-CPU 35 determines that the main CPU 31 is at the abnormal state and proceeds to S204. When performing the determination in S202, the sub-CPU 35 functions as an example of a detection unit.

When it is determined that the timer value of the main monitoring timer 55 which is read out by the sub-CPU 35 in S201 is the same as that of the main monitoring timer 55 read out in previous time (S202: Yes), the sub-CPU 35 performs the push detection of the power supply switch 45 and at least part of the power supply-off processing for the main CPU 31. That is, when the main CPU 31 is at the abnormal state, the main CPU 31 may not perform the appropriate power supply-off processing even though the power supply switch 45 is pushed. In the below, an example where the sub-CPU 35 performs the push detection of the power supply switch 45 and at least a part of the power supply-off processing for the main CPU 31 is described. In the meantime, when performing at least a part of the power supply-off processing for the main CPU 31, the sub-CPU 35 functions as an example of a vicarious control unit.

First, the sub-CPU 35 refers to the power supply SW flag 46 so as to check whether the power supply switch 45 is pushed (S204). Then, the sub-CPU 35 determines whether the power supply SW flag 46 is set (S205).

When the power supply SW flag 46 is set, it means that a value set for the power supply SW flag is a value other than '0'. When the input operation of the user is received, the power supply switch 45 sets the power supply SW flag 46. Also, when the power supply SW flag 46 is reset, it means that a value set for the power supply SW flag is returned to '0' from a value other than '0'. The power supply SW flag 46 which is set as the power supply switch 45 is pushed is kept at the set state insomuch as it is not reset by the main CPU 31. For example, when the main CPU 31 is at the abnormal state before the power supply switch 45 is pushed, the power supply SW flag 46 is kept at the set state.

When the power supply SW flag 46 is set (S205: Yes), the sub-CPU 35 performs a part of the push detection of the power supply switch 45 and a part of the power supply-off control processing, instead of the main CPU 31.

Specifically, the sub-CPU 35 resets the power supply SW flag 46 (S207) and sets the long press detecting timer 57 (S208). The set time of the long press detecting timer 57 is the predetermined input duration, like the case of the main CPU 31. Then, the sub-CPU 35 stands by until an interrupt signal is received (S210: No).

When an interrupt signal is received (S210: Yes), the sub-CPU 35 determines whether the cause of the interrupt is a time-up of the long press detecting timer 57 (S211). When it is determined that the cause of the interrupt is a time-up of the long press detecting timer 57 (S211: Yes), the sub-CPU 35 determines that an instruction of the power supply-off is received, and performs the power supply-off processing (S213).

The content of the power supply-off processing (S213) is the same as the processing that is performed by the main CPU 31 in S110 of FIG. 3. That is, the processing which is performed by the sub-CPU 35 in S207 to S213 is substantially the same as the processing (S105 to S110 in FIG. 3) which is performed by the main CPU 31 when the main CPU 31 is at the normal state. At a final step of the power supply-off processing, the sub-CPU 35 ends the main CPU monitoring processing and instructs the power supply unit 5 to interrupt the power supply to the units except for the power supply switch 45, so that the power supply-off state is made.

On the other hand, in S211, when it is determined that the cause of the interrupt is not a time-up of the long press detecting timer 57 (S211: No), there is a possibility that the cause of the interrupt is the switch interrupt which is transmitted when the power supply switch 45 is returned from the pushed state to the non-pushed state within predetermined time and it can be determined that the user does not want the switch to the power supply-off state, as described above. Therefore, the sub-CPU 35 returns to S201 without performing the power supply-off processing and again continues to monitor the main CPU 31.

Returning to S205, regarding the case where the sub-CPU 35 determines that the main CPU 31 is at the abnormal state, a case is described in which the power supply SW flag 46 is not set (S205: No). The sub-CPU 35 is not provided with a means for determining the exact timing at which the main CPU 31 becomes at the abnormal state. Therefore, the sub-CPU 35 should distinguish whether the power supply switch 45 is not originally pushed and whether the main CPU 31 becomes at the abnormal state after the power supply SW flag 46 is reset.

Therefore, when the power supply SW flag 46 is not set, the sub-CPU 35 determines whether the long press detecting timer 57 is set (S215). At the normal state, the main CPU 31 resets the power supply SW flag 46 and then sets the long press detecting timer 57 (refer to S105 to S106 in FIG. 3). Hence, when the long press detecting timer 57 is not set (S215: No), the sub-CPU 35 can determine that the power supply switch 45 is not originally pushed and the main CPU 31 becomes at the abnormal state. Thus, when a result of the determination in S215 is No, the sub-CPU 35 returns to S201 and again continues to monitor the main CPU 31.

On the other hand, when the long press detecting timer 57 is set (S215: Yes), the sub-CPU 35 determines that the main CPU 31 resets the power supply SW flag 46, sets the long press detecting timer 57 and then becomes at the abnormal state. When a result of the determination in S215 is Yes, the sub-CPU 35 proceeds to FIG. 6. An example where the sub-CPU 35 performs a part of the push detection of the power supply switch 45 and at least a part of the power supply-off processing for the main CPU is described. FIG. 6 is a flowchart showing processing which is performed subsequently to 'A' of FIG. 5.

Figure 5:
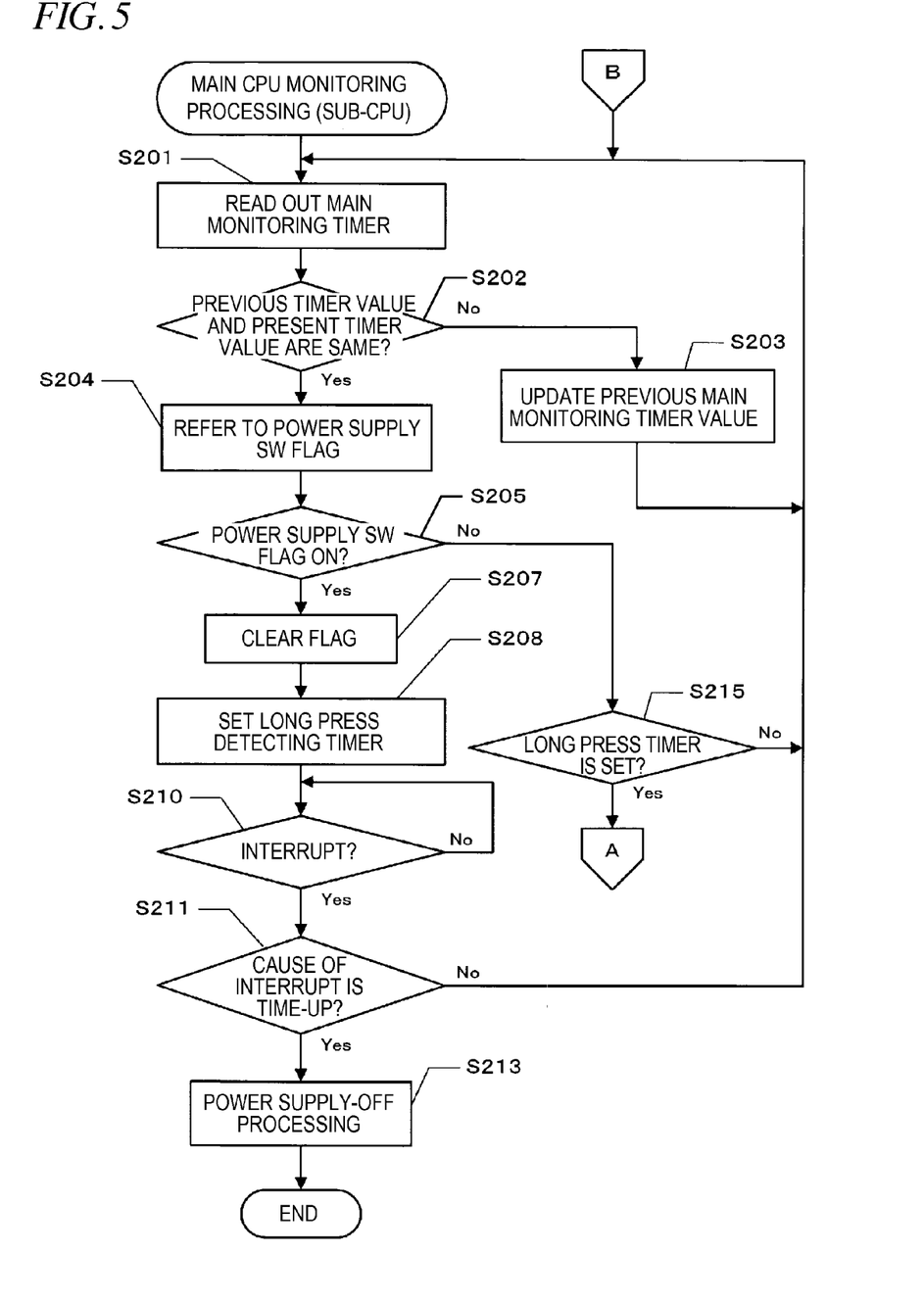
FIG. 5 is a flowchart showing main CPU monitoring processing which is performed in a sub-CPU.
Figure 6:
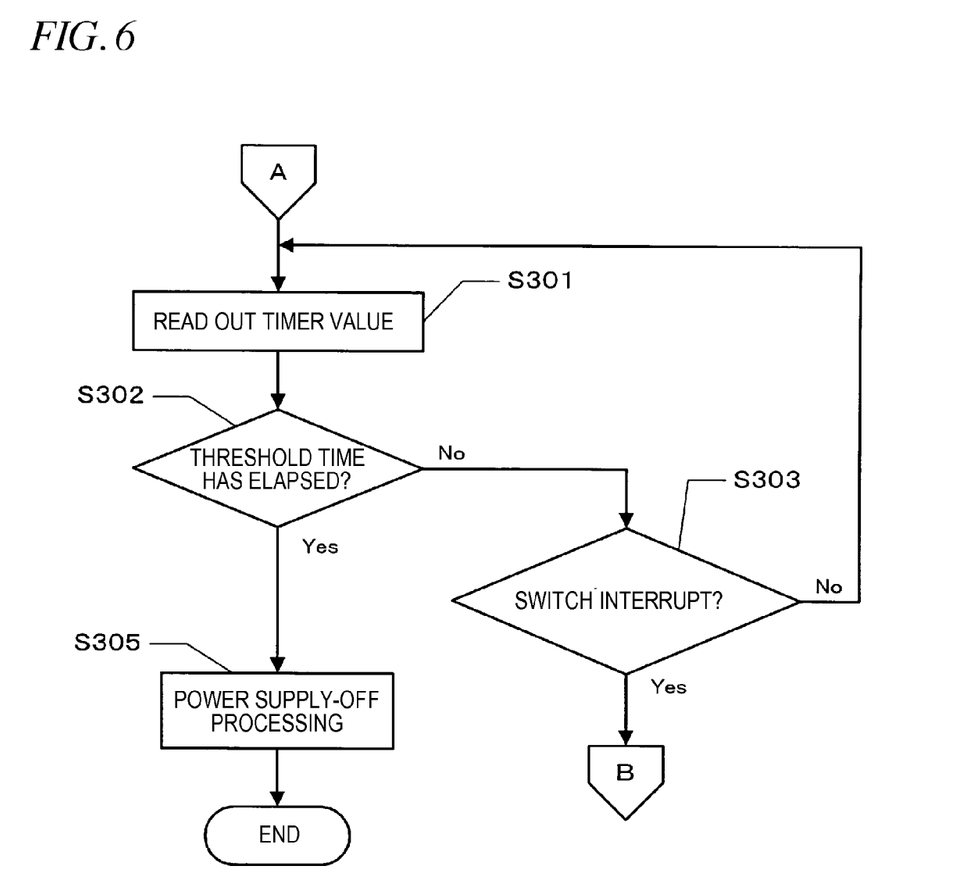
FIG. 6 is a flowchart which is continued from the flowchart showing the main CPU monitoring processing of FIG. 5.

When the long press detecting timer 57 is set (S215 of FIG. 5: Yes), the sub-CPU 35 reads out a timer value of the long press detecting timer 57 (S301 in FIG. 6). Here, in S301, the sub-CPU 35 reads out a timer value of the long press detecting timer 57 because the long press detecting timer 57 set by the main CPU 31 transmits the signal by the timer interrupt upon the time-up to the main CPU 31 having set the long press detecting timer 57. That is, the sub-CPU 35 cannot receive the signal by the timer interrupt of the long press detecting timer 57. Therefore, the sub-CPU 35 reads out the timer value of the long press detecting timer 57 to thereby acquire elapsed time after the long press detecting timer 57 is set.

Then, the sub-CPU 35 determines whether the read timer value of the long press detecting timer 57 is a predetermined threshold time or longer (S302). The threshold time is the input duration or longer which is set for the long press detecting timer 57 by the main CPU 31. When the threshold time does not elapse (S302: No), the sub-CPU 35 determines whether a signal by the switch interrupt is received which is transmitted when the power supply switch 45 is returned from the pushed state to the non-pushed state within predetermined time (S303).

When a signal of the switch interrupt is received which is transmitted when the power supply switch 45 is returned from the pushed state to the non-pushed state within predetermined time (S303: Yes), the sub-CPU 35 does not perform the power supply-off processing. When a result of the determination in S303 is Yes, the sub-CPU 35 proceeds to 'B' of FIG. 5, returns to S201 and continues to monitor the main CPU 31.

On the other hand, when a signal of the switch interrupt is not received which is transmitted when the power supply switch 45 is returned from the pushed state to the non-pushed state within the predetermined time (S303: No), the sub-CPU 35 again reads out the timer value of the long press detecting timer 57 (S301). While a signal of the switch interrupt is not received which is transmitted when the power supply switch 45 is returned from the pushed state to the non-pushed state within the predetermined time (S303: No), when the threshold time has elapsed (S302: Yes), the sub-CPU 35 can determine that the user intends to turn off the power supply. Therefore, the sub-CPU 35 performs the power supply-off processing (S305). With the above, the description of the main CPU monitoring processing which is performed in the sub-CPU 35 ends.

Main CPU Monitoring Processing (Sub-CPU)

Second Illustrative Embodiment

In the below, an example where the sub-CPU 35 monitors the main CPU 31 by a method different from the example shown in FIG. 5 is described with reference to a flowchart of FIG. 7. The main CPU monitoring processing of this second illustrative embodiment is performed when the MFP 100 turns on, and is continuously performed while the MFP 100 is at the power supply-on state.

When starting the main CPU monitoring processing of the second illustrative embodiment, the sub-CPU 35 determines whether a switch interrupt signal by the operation of the power supply switch 45 is received (S401). The switch interrupt signal which is issued as the power supply switch 45 is pushed is transmitted to both the main CPU 31 and the sub-CPU 35. While the user does not push the power supply switch 45, the interrupt signal is not received. Thus, the sub-CPU 35 stands by until a switch interrupt signal is received (S401: No).

When the user pushes the power supply switch 45, a switch interrupt signal is transmitted (S401: Yes) and the power supply SW flag 46 is set by the power supply switch 45. Then, as shown in FIG. 3, when the switch interrupt signal is received (S104: Yes) while the main CPU 31 normally operates, the main CPU 31 first resets the power supply SW flag 46 (S105).

In order to determine whether the main CPU 31 normally operates, the sub-CPU 35 refers to the power supply SW flag 46 (S403). When the main CPU 31 is at the normal state, the power supply SW flag 46 is reset by the main CPU 31. That is, when the power supply SW flag 46 is reset (S405: Yes), the sub-CPU 35 determines that the main CPU 31 normally operates, returns to S401 and stands by.

When the power supply SW flag 46 is not reset (S405: No), the sub-CPU 35 determines whether elapsed time from the reception of the switch interrupt signal exceeds a predetermined reset limit time (S407). When the elapsed time does not exceed the predetermined reset limit time (S407: No), it can be determined that the main CPU 31 normally operates and is at the normal state. Therefore, the sub-CPU 35 returns to S403 and again refers to the power supply SW flag 46. Then, the sub-CPU 35 repeats S403 to S407 until the power supply SW flag 46 is reset (S405: Yes) or the elapsed time exceeds the predetermined reset limit time (S407: Yes).

At a state where the power supply SW flag 46 is not reset, when the elapsed time from the reception of the switch interrupt signal exceeds the predetermined reset limit time (S407:

Yes), it can be determined that the main CPU 31 does not operate and is at the abnormal state. Therefore, the sub-CPU 35 determines that the main CPU 31 is at the abnormal state and performs the power supply-off processing for the main CPU 31. The content of the power supply-off processing which is performed by the sub-CPU 35 is the same as that of the processing of S207 to S213 shown in FIG. 5. However, in S211, when an interrupt signal is received which is transmitted when the power supply switch 45 is returned within the predetermined time (S211: No), the sub-CPU returns to S401 and stands by.

Figure 7:
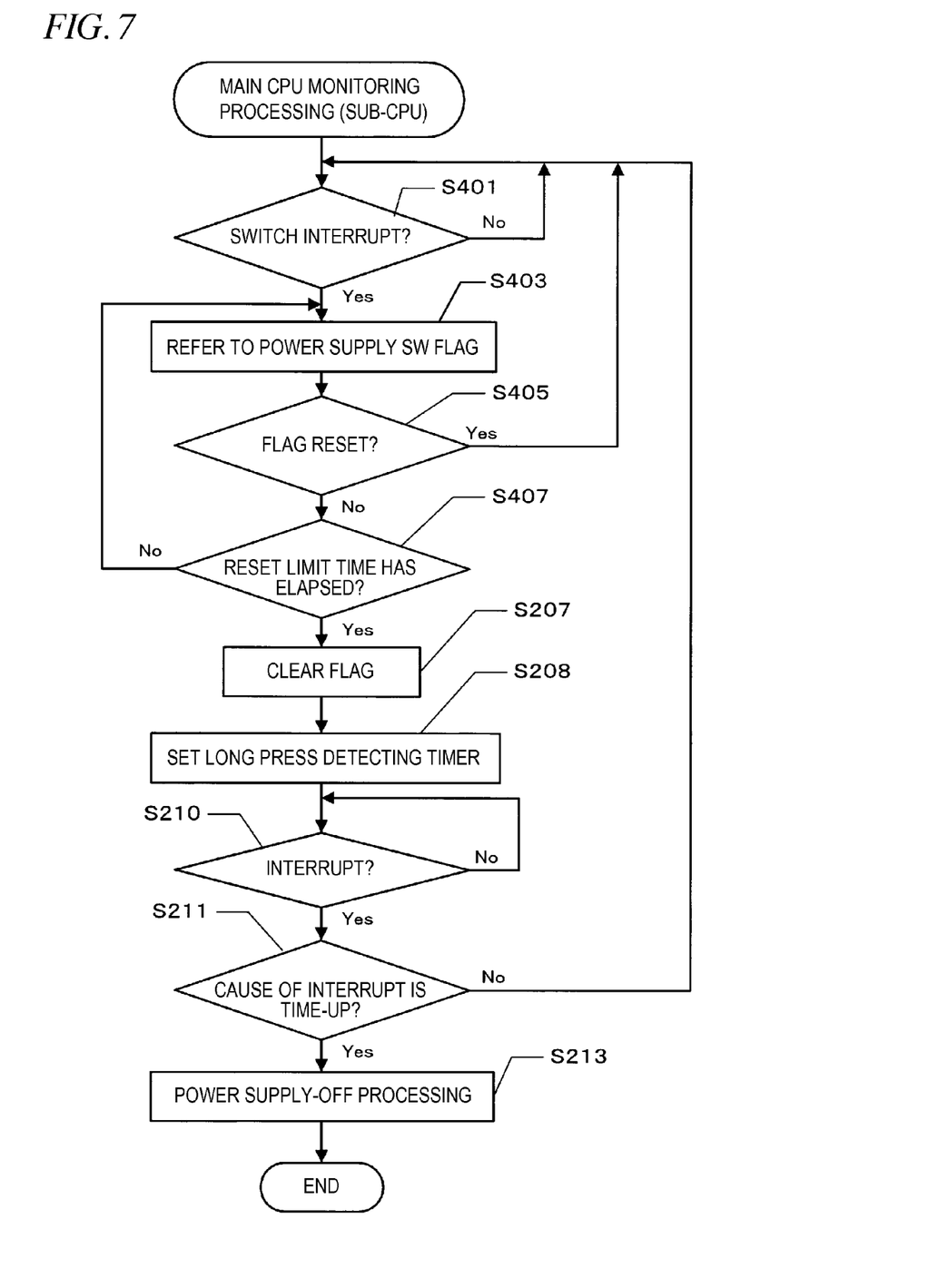
FIG. 7 is a flowchart (second illustrative embodiment) showing main CPU monitoring processing which is performed in the sub-CPU.

In the meantime, when the processing of the sub-CPU 35 is the main CPU monitoring processing of the second illustrative embodiment shown in FIG. 7, the sub-CPU 35 does not use an access unit for the monitoring. Therefore, the main CPU 31 does not have to perform the recording to the access unit such as the main monitoring timer 55 and the monitoring area 48 of the RAM 33. That is, the main CPU 31 does not perform S101 and S102 of FIG. 3.

In the main CPU monitoring processing of the second illustrative embodiment shown in FIG. 7, the sub-CPU 35 monitors the state of the main CPU 31 only when the power supply switch 45 is pushed. Also, when the main CPU monitoring processing of the second illustrative embodiment is adopted, it is not necessary to provide the access unit and the processing is simpler. With the above, the description of the main CPU monitoring processing of the second illustrative embodiment which is performed in the sub-CPU 35 ends.

Main CPU Monitoring Processing (Sub-CPU)

Third Illustrative Embodiment

In the first illustrative embodiment, the main CPU 31 is monitored by the main monitoring timer 55, which may not be certain in some cases. For example, although the monitoring processing by the main monitoring timer 55 is easy and a burden on the system is small even when it is frequently performed, the main monitoring timer 55 may be stopped according to the situations of the system. Also, although the main CPU 31 performs the clear processing of the main monitoring timer 55, there is a possibility that the main CPU 31 cannot perform the other processing, depending on a degree of the abnormal state of the main CPU 31.

Therefore, in a third illustrative embodiment, the periodic recording to the monitoring area 48 of the RAM 33, which is performed by the main CPU 31, is monitored. Thereby, it is possible to determine whether the main CPU 31 is at the abnormal state, more reliably, compared to the configuration of monitoring the main monitoring timer 55. The third illustrative embodiment in which the sub-CPU 35 monitors the main CPU 31 is described with reference to a flowchart of FIG. 8. Meanwhile, in the third illustrative embodiment, the parts performing the same processing as that of the first illustrative embodiment are denoted with the same reference numerals and the descriptions thereof are appropriately omitted.

Figure 8:
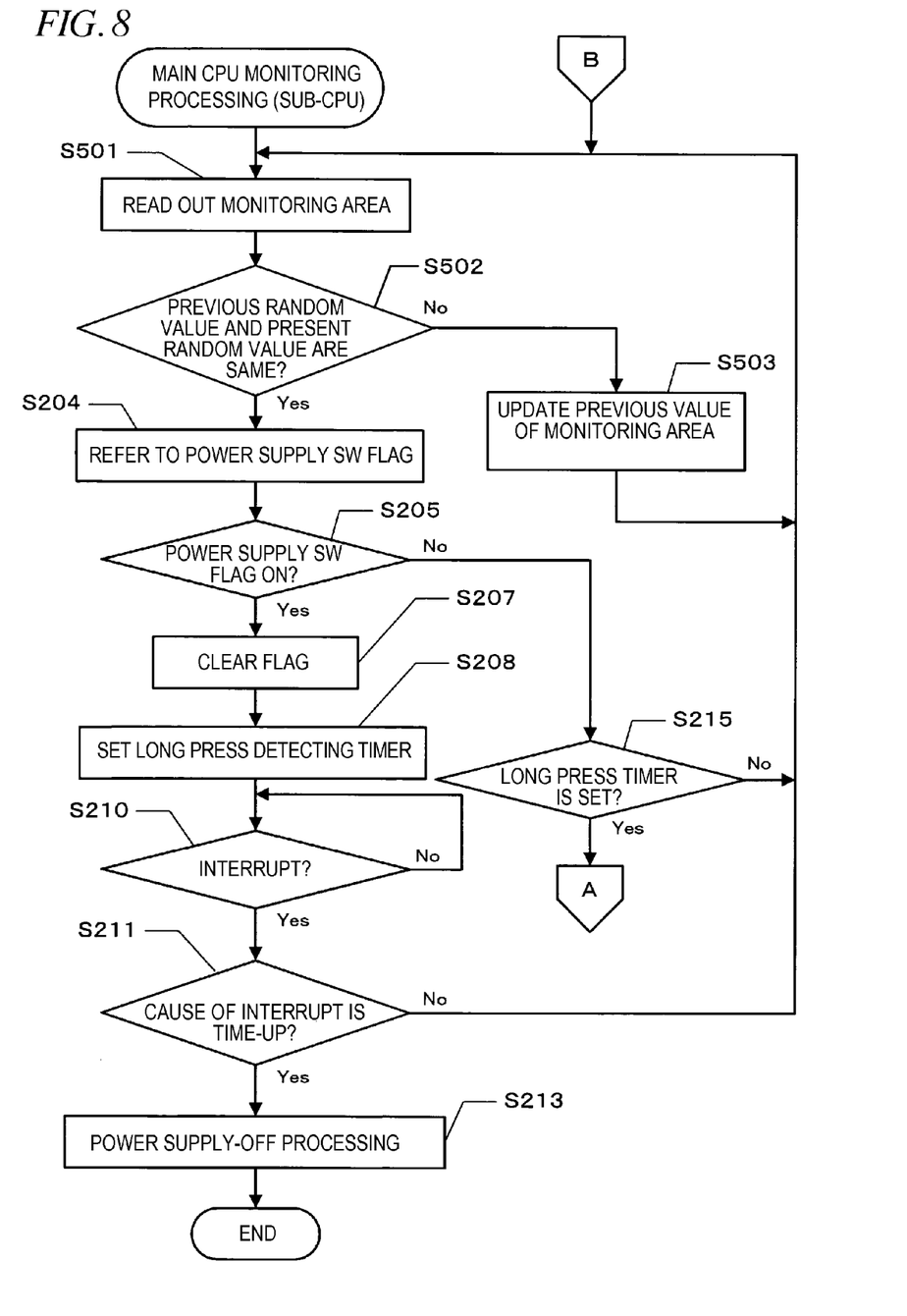
FIG. 8 is a flowchart (third illustrative embodiment) showing main CPU monitoring processing which is performed in the sub-CPU.

First, the sub-CPU 35 reads out a random value stored in the monitoring area 48 of the RAM 33 at appropriate timing (S501). As described above, in S102 of FIG. 3, the main CPU 31 performs the periodic recording even in the monitoring area 48 of the RAM 33. Hence, the sub-CPU 35 can determine whether the main CPU 31 is at the abnormal state by reading out the monitoring area 48.

The sub-CPU 35 determines whether the random value stored in the monitoring area 48, which is read out in S501, is the same as the random value stored in the monitoring area 48, which has been read out in previous time (S502). When it is determined that the random value stored in the monitoring area 48, which is read out in S501, is not the same as the random value stored in the monitoring area 48, which has been read out in previous time (S502: No), the sub-CPU 35 determines that the main CPU 31 is at the normal state where it normally operates, updates the random value stored in the monitoring area 48 in previous time to the random value stored in the monitoring area 48, which is read out in S501, (S503) and returns to S501.

On the other hand, when it is determined that the random value stored in the monitoring area 48, which is read out in S501, is the same as the random value stored in the monitoring area 48, which has been read out in previous time (S502: Yes), the sub-CPU 35 determines that the main CPU 31 is at the abnormal state and proceeds to S204. In the meantime, when performing the determination in S502, the sub-CPU 35 functions as an example of a detection unit.

As specifically described above, the MFP 100 of this illustrative embodiment has the main CPU 31 and the sub-CPU 35. The sub-CPU 35 monitors whether the main CPU 31 is at the abnormal state, and performs the power supply-off processing for the main CPU 31 when it is determined that the main CPU 31 is at the abnormal state. At the normal state of the main CPU 31, the main CPU 31 performs the power supply-off processing. On a condition that the power supply-off processing such as shut down processing is completed, the main CPU 31 instructs the power supply unit 5 to interrupt the power supply to the units except for the power supply switch 45, so that the power supply-off state is made.

When the abnormal state of the main CPU 31 occurs, the sub-CPU 35 performs the power supply-off processing, instead of the main CPU 31. Therefore, when a power supply-off command is received, there is a high possibility that the MFP 100 will be able to switch to the power supply-off state.

When performing the main CPU monitoring processing of the first illustrative embodiment, the sub-CPU 35 monitors the state of the main CPU 31 by referring to the value of the access unit which the main CPU 31 periodically accesses. Thus, the sub-CPU 35 can securely monitor the state of the main CPU 31. Also, when performing the main CPU monitoring processing of the second illustrative embodiment, the sub-CPU 35 monitors the state of the main CPU 31 by monitoring the operation of the main CPU 31 after the power supply switch 45 is pushed. Therefore, it is possible to perform the power supply-off processing for the main CPU 31 with the simple configuration.

While the present invention has been shown and described with reference to certain illustrative embodiments thereof, it will be understood by those skilled in the art that various changes in form and details may be made therein without departing from the spirit and scope of the invention as defined by the appended claims.

For example, the present invention is not limited to the MFP, and the inventive concept of the present invention can be applied to an apparatus having an image processing function such as copier, scanner, FAX and the like, a power supply switch which is implemented by a soft switch, and a power supply managing function by two CPUs.

In the above illustrative embodiments, when it is determined that the main CPU 31 is at the abnormal state, the sub-CPU 35 performs the entire power supply-off processing which should be performed by the main CPU 31. However, the processing which is performed by the sub-CPU 35 may be a part of the power supply-off processing. For example, the sub-CPU 35 may perform only the processing of changing the power supply state without performing the shut down processing. By doing so, the burden of the sub-CPU 35 is reduced and the power supply state can be reliably switched.

In the first illustrative embodiment, the main CPU 31 is monitored using the main monitoring timer 55, and in the third illustrative embodiment, the main CPU 31 is monitored using the monitoring area 48. However, the present invention is not limited thereto. For example, the main CPU 31 may be monitored using the main monitoring timer 55 and the monitoring area 48. The sub-CPU 35 reads out a random value from the monitoring area 48 at a time interval longer than the timing during which it refers to the main monitoring timer 55. Alternatively, when it is determined by the main monitoring timer 55 that the main CPU 31 may be at the abnormal state, the sub-CPU 35 reads out a random value from the monitoring area 48. Thereby, the sub-CPU 35 can determine the operating state of the main CPU 31 more reliably.

In the first illustrative embodiment, the power supply switch 45 is supplied with the power from the power supply unit 5 even at the power supply-off state.

However, the present invention is not limited thereto. For example, in order to switch from the power supply-off state to the power supply-on state, the power may be supplied to at least one of the main CPU 31 and the sub-CPU 35 even at the power supply-off state and a command of the power supply-off processing may be received from the power supply switch 45.

The processing described in the above illustrative embodiment may be performed by hardware such as single CPU, a plurality of CPUs, an ASIC and the like or a combination thereof. Also, the processing described in the above illustrative embodiment can be implemented by a non-transitory recording medium in which a program for performing the processing is recorded, a method and the like.

What is claimed is:

1. An image processing apparatus comprising:
   an image processing unit configured to perform image processing;
   a switch that receives an input of a command of power supply-off;
   a first controller configured to control supply of power to at least the image processing unit; and
   a second controller configured to perform control different from the first controller,
   wherein the first controller is configured to:
      detect an input to the switch; and
      when the input to the switch is detected while the image processing apparatus is supplied with power, perform power supply-off processing comprising switching the image processing apparatus to a state where the image processing apparatus is not supplied with power, and
   wherein the second controller is configured to:
      detect whether the first controller is in a hang-up state;
      in response to detecting that the first controller is in the hang-up state, perform vicarious processing of performing at least a part of the power supply-off processing of the first controller;
      detect the input to the switch for the first controller after detecting that the first controller is in the hang-up state;
      when the input to the switch is detected after the detecting that the first controller is in the hang-up state, determine whether a switch input state where the command is being input to the switch is the same for a predetermined time or longer; and
      perform the vicarious processing on a condition that the switch input state is the same for the predetermined time or longer.

2. The image processing apparatus according to claim 1, wherein the second controller, in response to detecting that the first controller is in the hang-up state, performs the vicarious processing of performing the entire power supply-off processing of the first controller.

3. An image processing apparatus comprising:
   an image processing unit configured to perform image processing;
   a switch that receives an input of a command of power supply-off;
   a first controller configured to control supply of power to at least the image processing unit;
   a second controller configured to perform control different from the first controller; and
   an access unit accessible by the first controller and the second controller, and to which the first controller performs a recording periodically,
   wherein the first controller is configured to:
      detect an input to the switch; and
      when the input to the switch is detected while the image processing apparatus is supplied with power, perform power supply-off processing comprising switching the image processing apparatus to a state where the image processing apparatus is not supplied with power, and
   wherein the second controller is configured to:
      detect whether the first controller is in a hang-up state;
      in response to detecting that the first controller is in the hang-up state, perform vicarious processing of performing at least a part of the power supply-off processing of the first controller; and
      periodically access the access unit and determine that the first controller is in the hang-up state when a content recorded in the access unit is not changed.

4. The image processing apparatus according to claim 3, wherein the first controller periodically records a random value to the access unit.

5. An image processing apparatus comprising:
   an image processing unit configured to perform image processing;
   a switch that receives an input of a command of power supply-off;
   a first controller configured to control supply of power to at least the image processing unit;
   a second controller configured to perform control different from the first controller;
   a storage area accessible by the first controller and the second controller and configured to store a flag; and
   a set unit that sets the flag on a condition that the input to the switch is detected while the image processing apparatus is supplied with power,
   wherein the first controller is configured to:
      detect an input to the switch; and
      when the input to the switch is detected while the image processing apparatus is supplied with power, perform power supply-off processing comprising switching the image processing apparatus to a state where the image processing apparatus is not supplied with power,
   wherein the second controller is configured to:
      detect whether the first controller is in a hang-up state; and
      in response to detecting that the first controller is in the hang-up state, perform vicarious processing of performing at least a part of the power supply-off processing of the first controller, wherein the first controller resets the flag after the input to the switch is detected, and wherein the second controller determines that the first controller is in the hang-up state when the flag is not reset for a threshold time or longer after the flag is set.

6. An image processing apparatus comprising:

an image processing unit configured to perform image processing;

a switch that receives an input of a command of power supply-off;

a first controller configured to control supply of power to at least the image processing unit; and a second controller configured to perform control different from the first controller, wherein the first controller is configured to:

detect an input to the switch; and when the input to the switch is detected while the image processing apparatus is supplied with power, perform power supply-off processing comprising switching the image processing apparatus to a state where the image processing apparatus is not supplied with power, and wherein the second controller is configured to:

detect whether the first controller is in a hang-up state; and     in response to detecting that the first controller is in the hang-up state, perform vicarious processing of performing at least a part of the power supply-off processing of the first controller, wherein when the input to the switch is detected while the image processing apparatus is supplied with power, the first controller starts a timer that measures a duration of a switch input state where the command is input to the switch, and performs the power supply-off processing on a condition that the measured duration of the timer is a predetermined time or longer, and wherein in response to detecting that the first controller is in the hang-up state, the second controller determines whether the timer is operating, and perform the vicarious processing in response to detecting that the measured ti-me duration of the timer is a predetermined time or longer.

* * * * *